Dec. 29, 1936.  S. B. COLGATE  2,065,887
TELEVISION IN COLOR
Filed Dec. 26, 1931  3 Sheets—Sheet 1
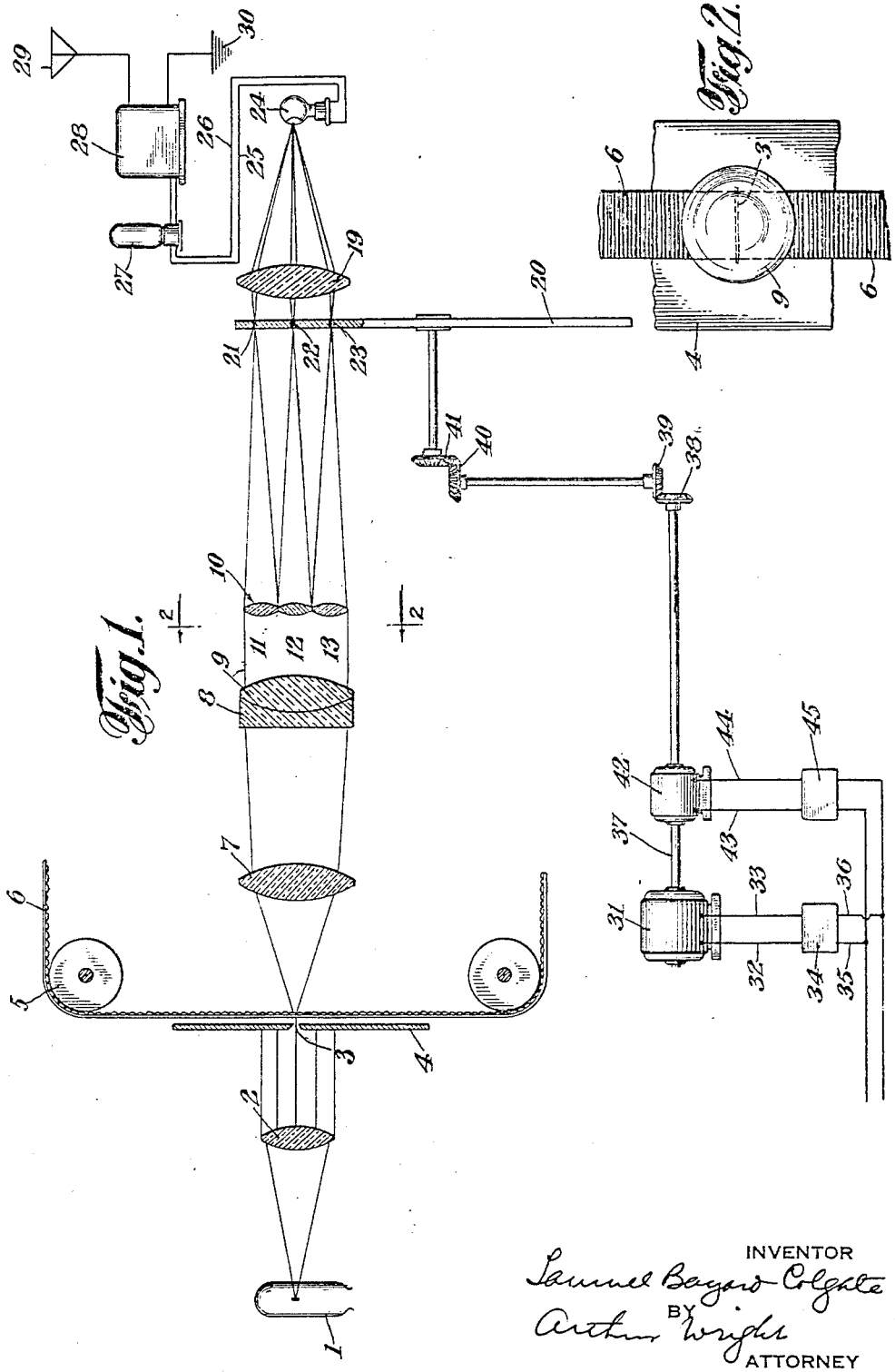

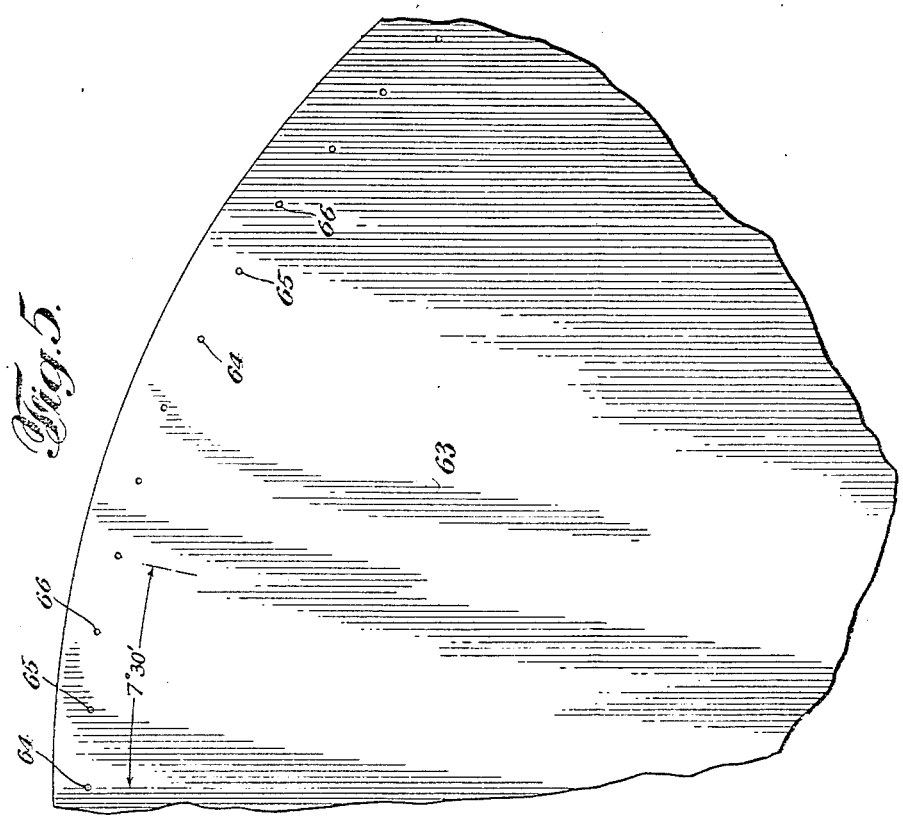
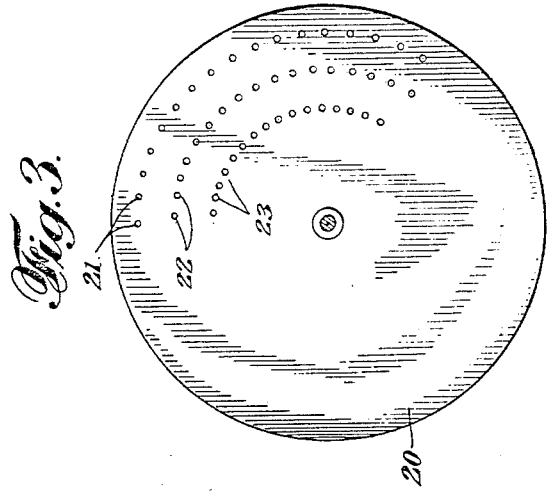

Dec. 29, 1936.   S. B. COLGATE   2,065,887
TELEVISION IN COLOR
Filed Dec. 26, 1931    3 Sheets-Sheet 3
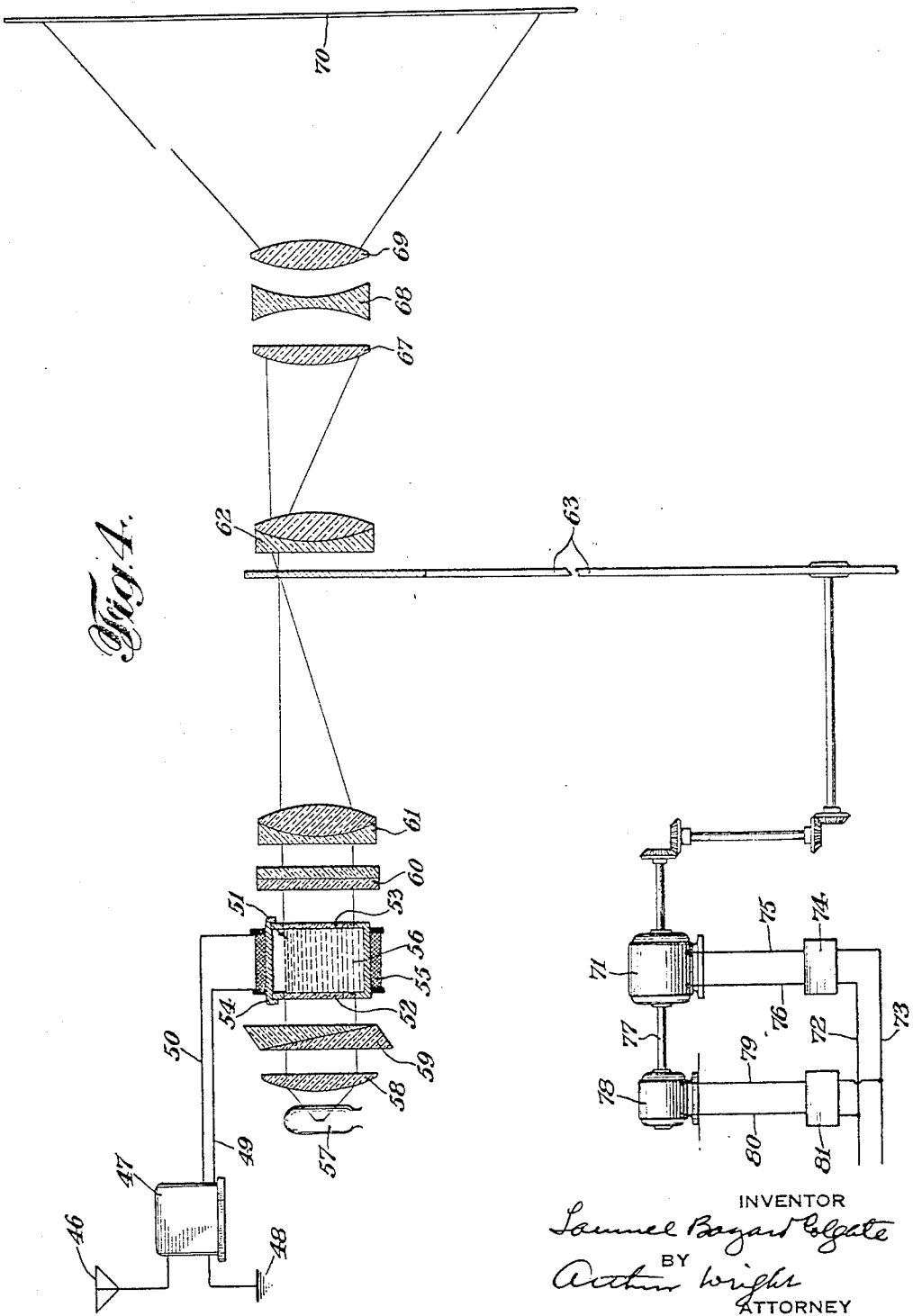
INVENTOR
Samuel Bogart Colgate
BY
Arthur Wright
ATTORNEY Patented Dec. 29, 1936

2,065,887

UNITED STATES PATENT OFFICE 2,065,887

TELEVISION IN COLOR

Samuel Bayard Colgate, Orange, N. J.

Application December 26, 1931, Serial No. 583,225

6 Claims. (Cl. 178—6)

The object of my invention is to provide an apparatus for television in colors which is applicable for exhibiting all types of subjects to be viewed at a distance but which is especially applicable to the transmission of motion pictures and views of all kinds which have been recorded on lenticular films such, for example, as motion picture films as used in the Keller-Dorian process.

One object of my invention is to provide an apparatus whereby television of the above character may be accomplished while avoiding any undue complexity. For example, the transmission of the component colors may be accomplished with the aid of a single photo-electric cell. Also, the necessity of reanalyzing the colors in sending is avoided. Further objects of my invention will appear from the detailed description of the same hereinafter.

While my invention is capable of embodiment in many different forms, for the purpose of illustration I have shown only one form of the same in the accompanying drawings, in which—

Fig. 1 is an elevation of a transmitting apparatus made in accordance with my invention;

Fig. 2 is a vertical section showing a portion of said apparatus taken at right angles to the position of the parts shown in Fig. 1;

Fig. 3 is an elevation of the scanning wheel used in sending, as shown in Fig. 1;

Fig. 4 is an elevation of the receiving apparatus; and

Fig. 5 is an elevation of the scanning wheel used in the receiving apparatus as shown in Fig. 4, for projecting on the screen.

In the drawings, I have shown a source of light 1 which may be preferably a Cotton incandescent lamp having a rectilinear filament, located in the rear of a collimating lens 2 adapted to project parallel rays of light through a horizontal slit 3 in a stationary gate 4. In front of the slit 3 there is continuously fed at a constant rate of speed, past the gate 4, by any suitable desired mechanism 5, a lenticulated film 6 carrying a series of cinematographic images for producing motion pictures in colors. This film 6 may, for example, be a transversely goffered Keller-Dorian film, or a film goffered in any other desired way, having linear lenticulations which may be approximately cylindrical in cross-section and which are preferably about 1/20 mm. in width, the said film having the lenticulations impressed in the celluloid support of the film facing away from the source of light 1, while the other face of the film carries the usual sensitized emulsion on which the images referred to have been taken photographically and completed in the usual way. The light which passes through the slit 3 passes through a bi-convex lens 7 and a composite lens 8, 9, a series of three lenses 10 being placed beyond the lenses 8 and 9, to receive images of the lamp 1. The said three lenses 10 correspond to and receive light from three zones 11, 12 and 13, representing the three colors blue, green and red respectively, these three zones being horizontal and, accordingly, parallel to the lines of goffering on the film 6. It will be understood in this connection that, in accordance with the Keller-Dorian motion picture process, back of each one of the cylindrical lenticles on the film 6 there are recorded separate exposed areas corresponding to the three different colors, blue, green and red, in the color filter used in taking the pictures, these three separate areas having become exposed separately behind this lenticle, by the three colors of the color filter zones entering the lenticles at different angles to the film. These three zones of light are then focused on a large field lens 19 to effectively concentrate the light. The three bands of light thus concentrated pass through a scanning wheel 20 which has near the periphery a succession of openings 21, preferably 48 in number, for transmitting the red light; slightly nearer to the center of the wheel a succession of the same number of openings 22 for transmitting the green light, these openings being placed so as to transmit the light at a slightly different interval of time; and a succession of the same number of openings 23 for similarly transmitting the blue light immediately subsequent to the green light through the openings 22, these openings being still nearer to the center of the scanning disk. The apparatus made in accordance with my invention is arranged to transmit this succession of colors, blue, green and red, from each linear portion of the film illuminated by the beam of light as each opening 21, 22 and 23 scans one such portion after another of the image so that, in effect, each part of the film thus illuminated is divided into the three colors by means of the scanning wheel which rotates at a sufficient speed to divide each portion illuminated by the light beam into three time intervals provided for transmitting the zones corresponding to the colors blue, green and red, respectively, in succession from each said area of the image. The light then becomes focused from the lens onto a photoelectric cell 24 constructed in any desired manner and in accordance with one of the well-known constructions of such cells used in television practice. The current then passes in the usual way by leads 25 and 26 to one or more vacuum tube amplifiers 27 and thence to a standard radio transmitter 28 which is connected to an aerial 29 having a ground 30. For synchronizing purposes an electric motor 31, connected by any suitable mechanism for driving the scanning wheel 20, may be connected by leads 32 and 33 to a filter 34 for a definite wave length connected in turn by leads 35 and 36 to any suitable source of current arranged to supply the motor 31 in any well-known manner with an alternating current of preferably 60 cycles for driving the motor 31 at a constant speed. On a shaft 37 of said motor 31 appropriate gears 38, 39, 40 and 41 may be provided for connecting the said motor 31 with the rotary scanner 20. In order to assist in the synchronization, the shaft 37 of the motor 31 may be provided also with another motor 42 operated on a current of preferably 2000 cycles, the same being connected by leads 43 and 44 through a filter 45 for a definite wave length with the leads 35 and 36 respectively, the motor 42 being preferably a special high frequency synchronous motor. It is found that with this arrangement any slight slippage or variation in the speed of the high frequency motor is not as great as the variations in the speed of the low frequency motor and that, accordingly, by using the two motors together a very accurate synchronization is obtained.

For receiving the images thus transmitted there is provided an aerial 46 connected to a standard radio receiving set 47 which is connected to a ground 48. This set is connected by leads 49 and 50 to a light-controlling cell 51 known as the Kerr cell, having windows 52 and 53 and a removable cover 54 and on the outside thereof a coil 55 in circuit with the radio receiver 47 in the usual way in order to produce a magnetic field within the chamber 56 therein, which may contain bisulfide of carbon or any other suitable substance to accentuate the rotation of the plane of polarization of the light in the electromagnetic field. The polarized light beam emanates from a source of light 57 of any desired character, from which the light passes through a collimating lens 58 and thence into a Nicol prism 59 of the usual character, designed to permit the passage therethrough of only one of the two plane-polarized beams. The plane-polarized light thence passes through the chamber 56 and through a Nicol prism analyzer 60 of the usual character, which is in a position at right angles to that of the Nicol prism 59, but which will allow the light to pass therethrough when the plane of polarization of the light is rotated between the prisms 59 and 60. When, therefore, the plane of polarization is shifted more or less, according to the strength of the electro-magnetic field produced in the chamber 56, which varies according to the intensity of the current received by means of the leads 49 and 50, the brilliancy of the beam of light will be varied accordingly, so as to duplicate the intensity of the beam in the transmitter at the particular moment. The beam so modified, thence passes through two plano-convex lenses 61 and 62, through a rotary scanner, and three-color filter 63 constructed as shown in Fig. 5 and arranged to operate in synchronization with the scanner 20. The rotary three-color filter 63 also acts as a scanner and, accordingly, is provided with forty-eight groups of holes 64, 65 and 66, carrying transparent colored celluloid filters which are red, green and blue respectively. Thence, the rays pass on to the usual projection objective comprised of a plano-convex lens 67, a bi-concave lens 68 and a bi-convex lens 69, and thence to a screen 70. When the rays are projected onto the screen 70 the colors from the holes 64, 65 and 66 will register one line on the screen corresponding to the line being scanned from the film 6. The same will take place as to another line through the succeeding group of three holes in the combined filter and scanner 63 so as to reproduce the colors red, green and blue on this line. This occurs successively until the entire image is reproduced on the screen 70. The synchronization of the color filter and scanner 63 with the scanner 20 is accomplished by starting the rotary parts in step with one another and using a constant speed drive, running at a speed coordinated with the transmitting apparatus. For this purpose there is provided a constant speed motor 71 of any desired type, but preferably operated by a current of 60 cycles, which may be connected to any suitable source of power by leads 72 and 73 which are connected through a filter 74, provided for a definite wave length, to the said motor by leads 75 and 76. For greater accuracy in synchronization the shaft 77 of the motor 71 carries an additional special high frequency synchronous motor 78 operated by a current of preferably 2000 cycles, the same being connected by leads 79 and 80 through a filter 81 for a definite wave length to the leads 72 and 73. The said motor 71 is driven synchronously with the motor 31, preferably by supplying them from the same service line. In other words, the two scanners 20 and 63 will be driven synchronously so as to transmit from both the light representing the same color in the same time intervals. Also, the scanning disks 20 and 63 will be driven in such a manner as to not only exhibit in succession the different portions, one after another, of each line of a particular image being illuminated from the opening 3 on the screen 70, but, due to the chronological sequence of the transmission of the linear portions of each particular image illuminated through the opening 3, the said linear portions will be projected upon their correct allotted places on the screen 70, so as to exactly duplicate on the screen 70 the different portions of each particular image as they appear in the scene photographed. The colors may not be wholly separate in each individual area on the screen 70, due to the fact that the speed of rotation of the scanners 20 and 63 will be such as to reproduce the three transmitted light values during the time that the scanning in the transmission apparatus is taking place over one and substantially the same area of the picture, but this effect will be merely to better blend the colors on the screen 70 and, accordingly, blend them to better advantage in the eyes of the observer.

It will be understood, of course, that other detailed types of apparatus may be used for carrying out the principles contained in my invention. For instance, other types of scanning devices may be used either in the transmission apparatus or in the receiving apparatus or both. Also, other types of light sensitive apparatus for transmitting to the receiving apparatus a given intensity of light at a particular point may be used, if desired. Furthermore, other optical systems may of course be interposed in accordance with the design of the particular apparatus. Also, this may be true of the synchronizing mechanism as well.

While I have described my invention above in detail, I wish it to be understood that many changes may be made therein without departing from the spirit of the same.

I claim:

1. In a device of the character described, the combination of a lenticulated film, a source of light, means including transmitting apparatus having a scanner with openings adapted to transmit the individual different color registrations back of each lenticulation separately in succession from an area of the film and a single photo-electric cell adapted to receive the light from and be actuated by the separate different color registrations in succession.

2. In a device of the character described, the combination of a lenticulated film, a source of light, means including transmitting apparatus having a scanner with openings adapted to transmit the individual different color registrations back of each lenticulation separately in succession from an area of the film, a single photo-electric cell adapted to receive the light from and be actuated by the separate different color registrations in succession and means for broadcasting by radio the current variations from the photo-electric cell.

3. In a device of the character described, the combination of a lenticulated film, a source of light, means having a scanner with openings adapted to transmit the individual different color registrations back of each lenticulation separately in succession from an area of the film, a single photo-electric cell adapted to receive the light from and be actuated by the separate different color registrations in succession, and means for segregating and concentrating the rays from the different color registration zones before transmitting the same.

4. In a device of the character described, the combination of a lenticulated film, a source of light, means having a scanner with openings adapted to transmit the individual different color registrations back of each lenticulation separately in succession from an area of the film, a single photo-electric cell adapted to receive the light from and be actuated by the separate different color registrations in succession, means for broadcasting by radio the current variations from the photo-electric cell and means for segregating and concentrating the rays from the different color registration zones before transmitting the same.

5. In a device of the character described, the combination of a lenticulated film, a source of light, a multiple color filter through which the light is passed from the film, means having a scanner with openings adapted to transmit the individual different color registrations back of each lenticulation separately in succession from an area of the film, a single photo-electric cell adapted to receive the light from and be actuated by the separate different color registrations in succession and means, comprising three lenses for the different color zones, for segregating and concentrating the rays from the different color registration zones before transmitting the same.

6. In a device of the character described, the combination of a lenticulated film, a source of light, means having a scanner with openings adapted to transmit the individual different color registrations back of each lenticulation separately in succession from an area of the film, a single photo-electric cell adapted to receive the light from and be actuated by the separate different color registrations in succession, means for broadcasting by radio the current variations from the photo-electric cell and means, comprising three lenses for the different color zones, for segregating and concentrating the rays from the different color registration zones before transmitting the same.

SAMUEL BAYARD COLGATE.